United States Patent [19]

Mullen et al.

[11] Patent Number: 5,149,406
[45] Date of Patent: Sep. 22, 1992

[54] ELECTRICAL FIELD QUENCHING OF OPTICAL BREAKDOWN

[75] Inventors: Ruth A. Mullen, Malibu; Robert W. Hellwarth, Santa Monica, both of Calif.

[73] Assignee: Hughes Aircraft Company, Los Angeles, Calif.

[21] Appl. No.: 389,208

[22] Filed: Aug. 3, 1989

[51] Int. Cl.[5] ............................................. C01B 33/00
[52] U.S. Cl. ........................ 204/157.22; 204/157.41; 204/157.44; 250/282; 250/283
[58] Field of Search ............... 204/DIG. 11, 157.22, 204/157.41, 157.44; 250/282, 283

[56] References Cited

U.S. PATENT DOCUMENTS 3,973,213  8/1976  Rockwood .................... 372/58 X
4,545,878  10/1985  Bridges ....................... 204/157.15

OTHER PUBLICATIONS

Y. R. Shen, "The Principles of Nonlinear Optics", Chap. 27, John Wiley & Sons, New York, 1984.
J. P. Novak et al., "Calculation of $SF_6$ Transport Coefficients from revised Data", J. Phys. D:Appl. Phys., 15, 1982.
M. C. Sneed et al., "Purification of Colloids", *General Inorganic Chemistry*, Van Nostrand Co., New York, 1942.
S. C. Brown "Introduction to Electrical Discharges in Gases", John Wiley & Sons, Inc. 1966, Chapter 10, p. 165, High Frequency Breakdown; Chapter 11, p. 188, DC breakdown; and Chapter 13, pp. 211-213, Glow Discharges.
McGraw-Hill Dictionary of Scientific and Technical Terms, 1984, pp. 213; 469; and 1248.
N. A. G. Ahmed, "Ion Plating Technology Developments and Applications", John Wiley & Sons, 1987, pp. vii-13.
A. Roth, "Production of Low Pressures", *Vacuum Technology*, North-Holland, N.Y., 1976, pp. 226-237.

*Primary Examiner*—John Niebling
*Assistant Examiner*—David G. Ryser
*Attorney, Agent, or Firm*—V. D. Duraiswamy; W. K. Denson-Low

[57] ABSTRACT

Optical breakdown in a transparent, non-linear medium used for optical phase conjugation or the like is induced by interaction with the medium of a strong laser beam propagating therethrough, resulting from electron avalanche breakdown and plasma formation. Application of an electrical potential to electrodes disposed across the laser focal volume in the medium causes optically and/or electrically ionized impurities to be removed from the non-linear medium and attached to the electrodes, thereby purifying the medium and raising the optical breakdown threshold. The threshold may be further raised by adjusting the electric potential to a magnitude at which free electrons are removed from the laser focal volume either during an optical pulse or before the arrival of subsequent pulses.

15 Claims, 5 Drawing Sheets

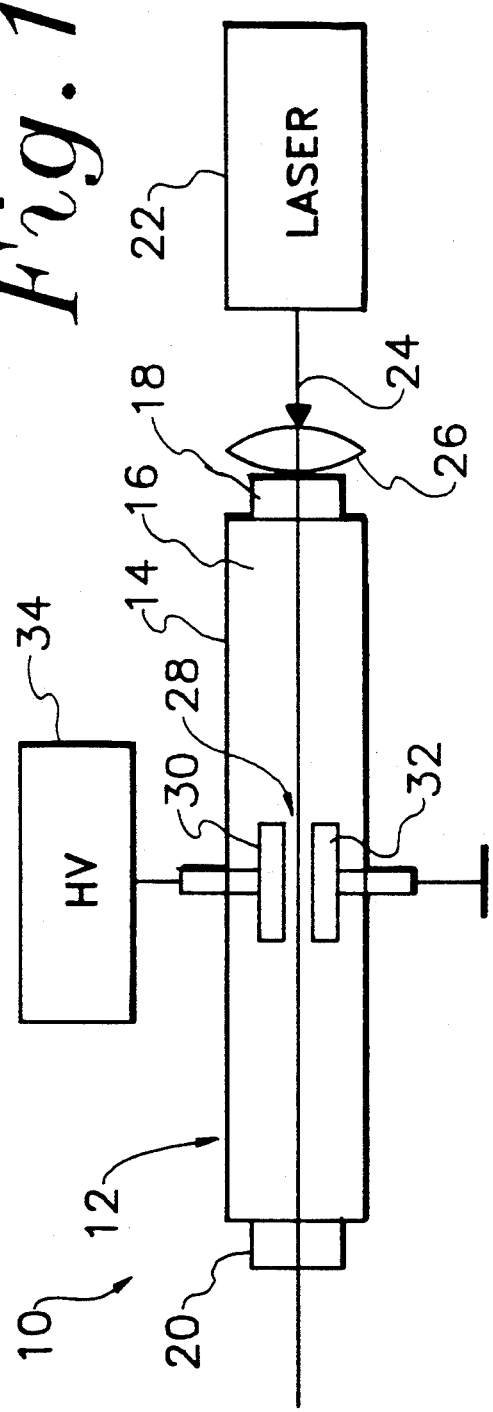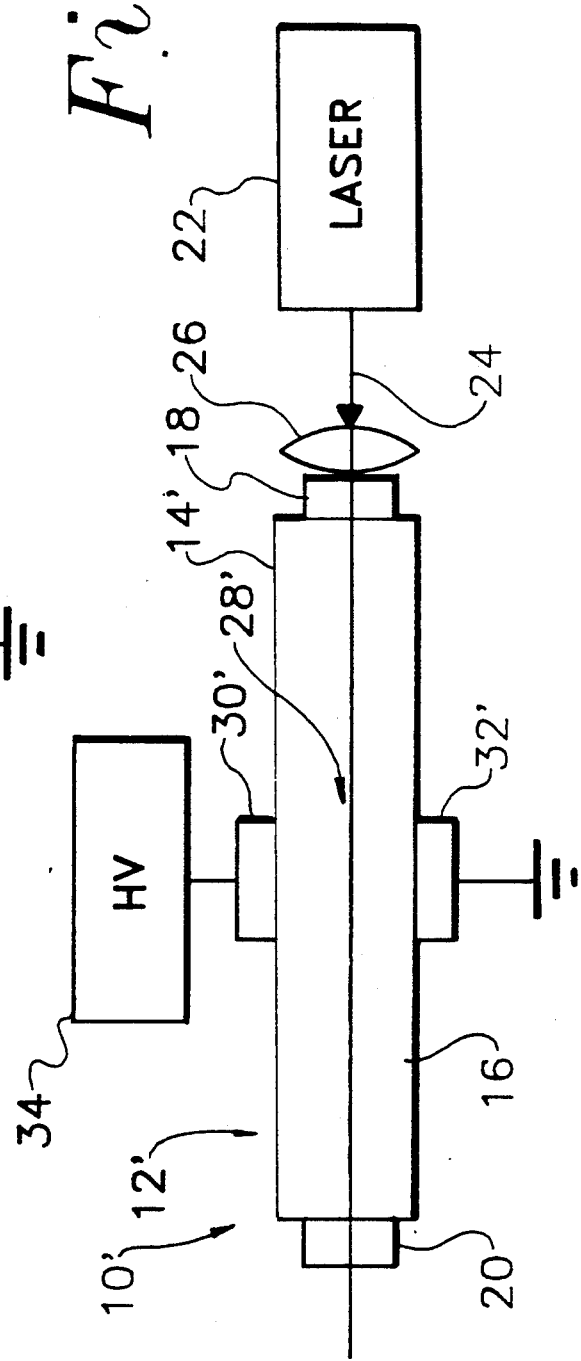

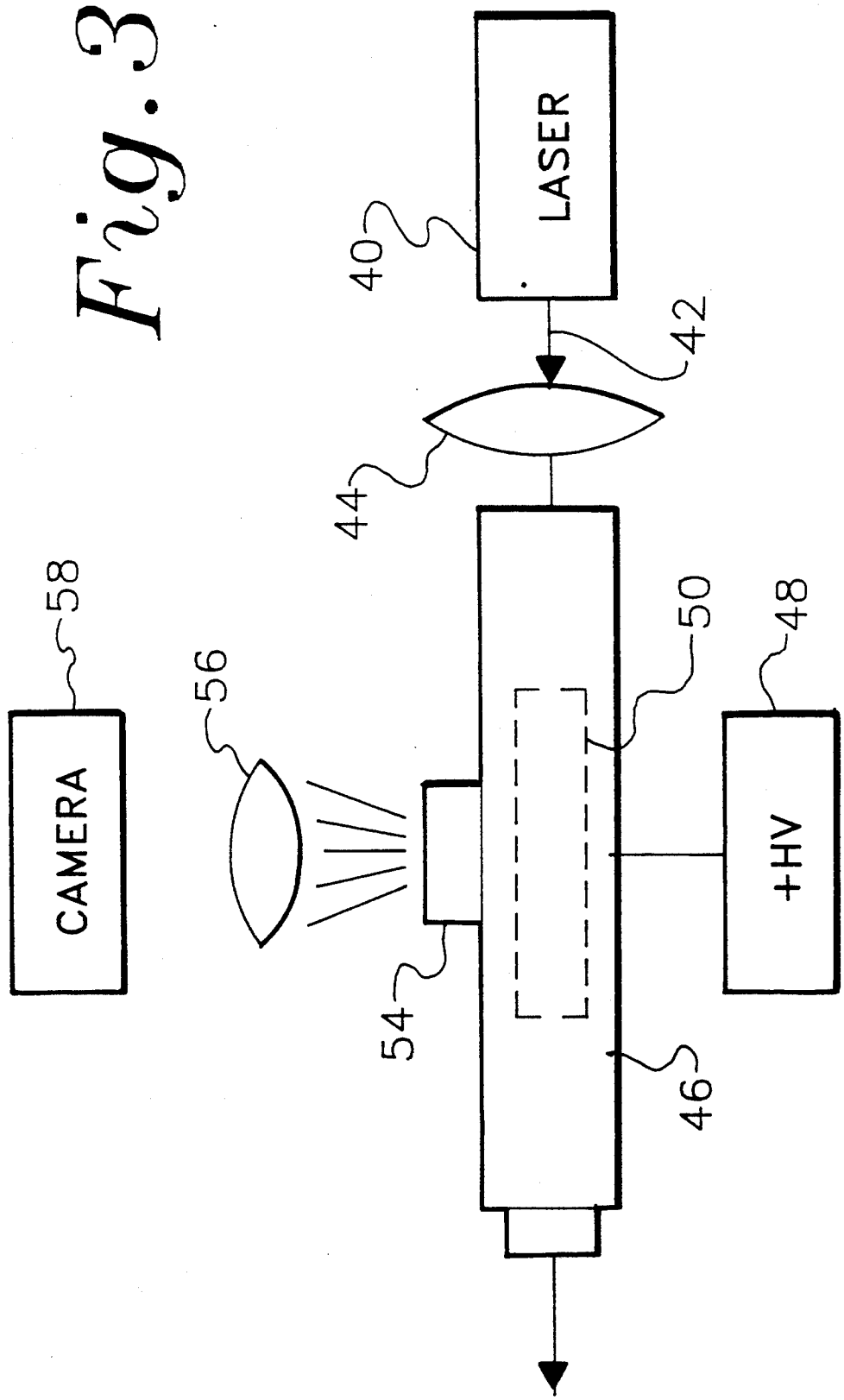

Fig. 6.

| ENERGY IN TRAIN $\varepsilon_{train}$(mJ) | SF$_6$ PRESSURE P (psi) | dc FIELD E(kVcm$^{-1}$) | OBD FREQUENCY | | | | | |
|---|---|---|---|---|---|---|---|---|
| | | | V=0 | HV | V=0 | HV | V=0 | |
| 7.8 | 316 | 150 | 0.16 | 0.02 | — | — | — | |
| 9.5 | 311 | 99 | 0.73 | 0.31 | 0.28 | 0.13 | 0.03 | |
| 10.0 | 157 | 259 | 0.29 | 0.10 | 0.02 | — | — | |
| 17.0 | 155 | 289 | 0.61 | 0.52 | 0.40 | 0 | 0 | |

Fig. 8.

| TIME INTERVAL | DIFFUSION LENGTH (μm) | DRIFT LENGTH (μm) | |
|---|---|---|---|
| | | E/ρ=9.2 Vcm$^{-1}$TORR$^{-1}$ | 36 Vcm$^{-1}$TORR$^{-1}$ |
| $t_p$ = 200 ps | 4.9 | 4.8 | 16 |
| $\Delta t$ = 7.5 ns | 30 | 180 | 608 |

ELECTRICAL FIELD QUENCHING OF OPTICAL BREAKDOWN

BACKGROUND OF THE INVENTION

1. Field of the Invention

The present invention generally relates to non-linear optics, and more particularly to quenching or suppression of optical breakdown induced by propagation of a strong laser field through a non-linear medium in a cell used for non-linear optics.

2. Description of the Related Art

Optical breakdown (OBD) is the catastrophic evolution of damage inflicted in a transparent medium by a strong laser field, resulting in electron avalanche and plasma formation. The process begins with a small number of free electrons which naturally occur in the medium, or are generated by laser-induced (multiphoton) ionization. Electron avalanche can develop if the electrons are able to gain energy from the laser field, since they can then attain enough energy to ionize an atom in collision, and repetitions of the process will lead to a rapid multiplication of electrons. Cascade ionization or electron avalanche follows, with the resultant formation of a plasma. As soon as the level of ionization becomes appreciable, the incoming light can be readily absorbed by free electrons via free-free transitions in the field of ions. This causes intense heating of the electron plasma and a consequent rapid hydrodynamic expansion of the plasma in the form of a shock wave. The final result is the appearance of a spark in the medium. A general treatise on OBD is found in "The Principles of Non-Linear Optics, Chapter 27, John Wiley and Sons, New York, 1984.

OBD is a serious problem in applications of non-linear optics to high-energy and medium-energy laser systems. For example, OBD competes strongly with stimulated Brillouin scattering (SBS) and stimulated Raman scattering (SRS) under a number of conditions. SBS and SRS are both important mechanisms for optical phase conjugation, beam combining, beam clean-up, wavelength shifting, and other applications.

Electric fields have previously been used to clean up exhaust from factory chimneys in what is known as a Cottrell process. Particles of soot are ionized in the corona of an applied electric field. The soot is then drawn out of the chimney by an applied electric field and deposited on some electrodes. This process, developed in the early 1900's, was designed to reduce the amount of soot in chimney exhaust, and is discussed in a textbook entitled "General Inorganic Chemistry", by J. L. Maynard et al, Van Nostrand Co., New York 1942, pp. 775-778. By contrast, the present invention could use either optical or electrical fields to ionize contaminants, and furthermore, the applied electric field need not necessarily remove the contaminants from the transparent medium, but need to only remove it from the region of the overlap between the optical beam and the medium. In the present invention, a nominally-pure medium is made ultra-pure in order to affect its optical breakdown properties.

Another related art known as "ion plating" was developed and patented by D. M. Mattox at the Sandia National Laboratories, and is described in a textbook entitled "Ion Plating Technology Developments and Applications", by N. Ahmed, John Wiley & Sons, 1987, pp. 1-12. This is a means for depositing films on metallic substrates by using the substrates as electrodes in a high-vacuum environment. In this system, atoms are electrically ionized and electrically drawn to the metallic substrates where they stick, thus coating the substrate uniformly. By contrast, in the present invention, atoms or groups of atoms can be ionized either optically or electrically. The purpose of the present invention is not to obtain a good coating, but to purify the non-linear optical medium.

Finally, getter-ion pumps are high-vacuum pumps which "clean-up" inert gases by electrically ionizing atoms or groups of atoms and drawing the positive ions to the wall. This process is described in a textbook entitled "Vacuum Technology", by A. Roth, North-Holland, New York, 1976, pp. 227-237. Again, in the present invention, contaminants can be ionized either optically or electrically. Furthermore, the present invention has been demonstrated to work under high-pressure conditions. Finally, the end result of the present invention is to increase the threshold for OBD; getter-ion pumps are designed to obtain ultra-high vacuum.

All three examples of prior art described above use an electric field to cause electrical breakdown. By contrast, in the present invention, the applied electric field quenches or suppresses optical breakdown.

The problem posed by OBD is particularly severe for SBS phase conjugation applications involving pulse lengths shorter than the Brillouin lifetime. In this case, relatively high peak powers are needed to obtain above-threshold operation of SBS; these high peak powers approach and surpass the OBD threshold of many non-linear materials. Laser pulse formats involving trains of short pulses generated by radio frequency free electron lasers (rf FELs) or mode-locked solid state lasers are particularly prone to OBD problems since the interpulse time interval of these systems is short relative to the amount of time it takes for electrons to diffuse out of the focal volume.

SUMMARY OF THE INVENTION

The optical breakdown threshold of a material has previously been considered to be a constant of the material properties (ionization energy, electron attachment coefficients, electron diffusion coefficients, pressure, etc.), and the parameters of the optical system (wavelength, focal diameter, pulse length, repetition rate, etc.). Previous methods for increasing OBD thresholds include adjustments of gas pressure, optical wavelength, laser pulse width, the energy in each pulse, the laser repetition rate, and the focussing geometry. The disadvantages of these methods is that they all impact other aspects of any optical system design. The laser wavelength, pulse width, pulse energy, and repetition rate, for example, may all be fixed for a particular application. The focussing geometry and gas pressure may need to be adjusted to optimize the non-linear response of the material or to avoid window damage. It has heretofore been difficult or impossible to meet all of the system requirements, optimize the desired optical non-linearity and still avoid OBD.

The present invention enables the OBD threshold of a transparent, non-linear medium to be increased independently of the other relevant optical parameters. Designers thus have more latitude to choose the material and device parameters such as gas pressure and focusing geometry to optimize the non-linear response. This is accomplished in accordance with the invention by the application of an electrical field, which increases the OBD threshold of the medium without affecting any of the other parameters of the system. The electric field quenches, or suppresses OBD.

Non-linear media, such as gaseous $SF_6$ under high pressure, have high OBD thresholds in their pure, intrinsic form. However, the OBD threshold is significantly lowered if there are absorbing particles, or impurities with low ionization energies, present in the medium, because they provide the primary electrons for avalanche ionization. Application of an electrical potential to electrodes disposed across the laser focal volume in the medium causes ionization of impurities. The resulting ions are then drawn onto the electrodes, thereby purifying the gas and raising the optical breakdown threshold. It has been determined that temporary application of the electric potential with sufficient magnitude to "clean-up" the medium by irreversibly depositing the impurity ions on the electrodes enables the fabrication of a cell containing a highly pure, non-linear medium which can be used without the further application of electrical potential.

For applications involving sufficiently high pulse energies and/or intensities such that OBD continues to occur even after contaminants have been removed, this invention provides a means for further increasing the optical breakdown threshold by removing free electrons from the optical interaction volume either during a pulse itself or during the time interval between pulses.

Experimental results have indicated that OBD can be completely eliminated for practical purposes in many applications by means of electrical field quenching in accordance with the invention.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1 is a schematic diagram illustrating a first embodiment of electrical field quenching of optical breakdown according to the present invention;

FIG. 2 is a schematic diagram illustrating a second embodiment of the invention;

FIG. 3 is a diagram illustrating an experimental apparatus for testing the principle of the invention;

FIG. 6 is a table summarizing the results of tests made using the experimental apparatus;

FIG. 8 is a table summarizing important values derived from the graph of FIG. 7.

DETAILED DESCRIPTION OF THE INVENTION

Figure 4:
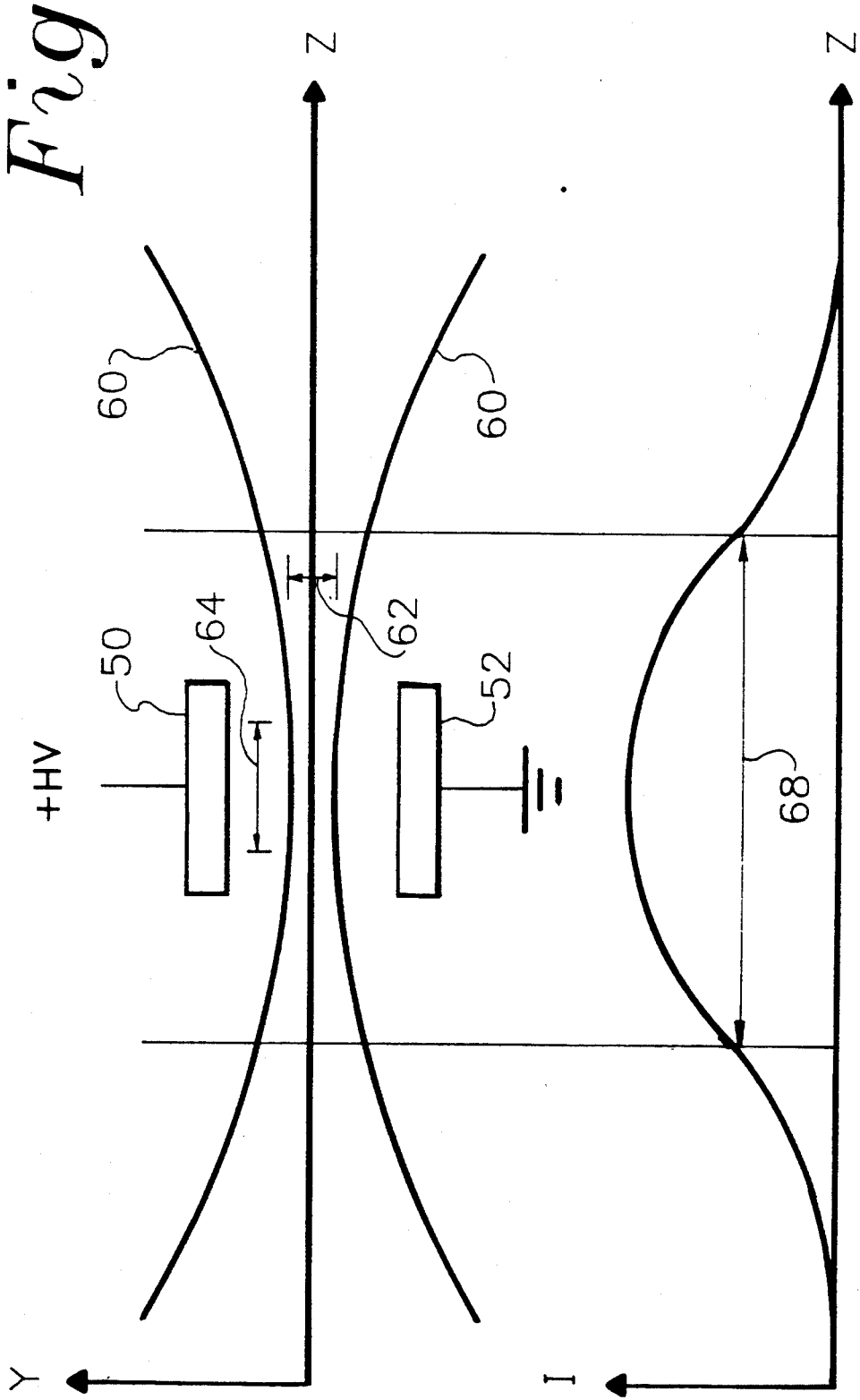
FIG. 4 is a diagram illustrating the optical parameters of the experimental apparatus.

Referring now to FIG. 1 of the drawing, a non-linear optical apparatus according to the present invention is generally designated as 10 and comprises a cell 12 which includes an electrically conductive, metal container 14. The container 14 in the form of a hollow tube, and encloses therein a non-linear medium 16. For practical non-linear optical applications, the medium 16 is a transparent gas, such as $SF_6$, at a pressure of several hundred psi. The container 14 is provided with a transparent window 18 to enable a laser beam to enter the cell 12, where the beam overlaps the nonlinear medium in a region called the optical interaction volume or, simply the interaction volume. Another window 20 may be provided at the other end of the container 14 to enable the laser beam to pass therethrough and exit from the cell 12. Further illustrated in FIG. 1 is a laser 22 which generates a beam 24, and an optical system which is symbolically shown as a converging lens 26, which focusses the beam 24 to a point in a focal or interaction volume 28 inside the cell 12.

In a conventional cell enclosing a transparent, non-linear medium, OBD competes strongly with SBS and SRS as a phenomenon produced by interaction of the laser beam 24 with the molecules and atoms of the medium 16. As discussed above, optimal adjustment of the optical and material parameters of the apparatus 10 to produce the desired non-linear optical phenomenon without producing OBD is difficult, if not impossible, in many practical applications. This problem is overcome in a novel manner according to the present invention by providing first and second electrodes 30 and 32 positioned inside the container 14 in such a way that the electric field lines going between the electrodes pass through the interaction volume 28. The electrode 32 is grounded, whereas the electrode 30 is connected to a source 34 of high voltage direct current potential (dc in reduction to practice, but ac might be better in some applications). Although the source 34 is shown as producing a voltage or potential which is positive with respect to ground, the polarity may be reversed within the scope of the invention, and the electrode 32 may be held at a potential other than ground.

Even using advanced processing techniques, it is very difficult to refine a non-linear gas such as $SF_6$ to such a high extent that impurities do not cause a significant reduction in the OBD threshold thereof. The problem is compounded by the necessity of transferring the medium from a generating apparatus into the container 14. In accordance with the present invention, an electrical field is applied to the medium 16 by means of the voltage source 34 and the electrodes 30 and 32 disposed across the focal volume 28 of the laser beam 24. The electric potential applied across the electrodes 30 and 32 creates the electric field which causes optically ionized impurities in the medium 16, to drift towards electrodes 30 and 32. Where the ionization results in the creation of a positive ion and a free electron, the positive ion will be attracted to the second electrode 32 and will stick or adhere thereto. the drift velocities of the ions will increase roughly linearly with the applied electric field strength. The free electron will be attracted to the first electrode 30. It has been determined experimentally that ions and electrons created by optical ionization adhere to the electrodes 30 and 32 in a substantially permanent manner, so that the voltage source 34 may be disconnected after the electrical and optical fields have been applied for a sufficient length of time to remove substantially all of the impurities in the medium 16 and adhere them to the electrodes 30 and 32. Thus, the present invention provides a method of cleaning up or purifying the non-linear medium in the cell 12. After purification, the cell 12 may be used as desired without the necessity of applying an electrical potential to the electrodes 30 and 32 again.

As will be discussed further below, increasing the electrical potential applied by the source 34 to a sufficiently high value will result in a further increase in the OBD threshold. This effect is produced by removing free electrons from the focal volume 28 at a high enough rate that the electron density remains below a critical level at which avalanche breakdown begins to occur.

FIG. 2 illustrates a second embodiment of the invention in which similar but modified elements are designated by the same reference numerals used in FIG. 1 primed. The embodiment of FIG. 2 differs from the embodiment of FIG. 1 in that the electrically conductive metal container 14 is replaced by an electrically insulating container 14' made of glass or the like, and electrodes 30' and 32' are disposed on the outside of the container 14' rather than inside thereof. The principle of applying an electrical potential across the electrodes 30' and 32' to increase the OBD threshold in an interaction volume 28' is essentially similar to that of the embodiment of FIG. 1.

The principle of the present invention was confirmed experimentally by means of a test apparatus illustrated in FIG. 3. A Nd:YAG mode-locked laser 40 generated a beam 42 which was focussed by an optical system 44 into an SBS cell 46 having the configuration of the cell 10 of FIG. 1. A source 48 of high direct current voltage or potential was connected to an electrode 50 which corresponds to the electrode 30 of FIG. 1. Another electrode 52 which is visible in FIG. 4 and corresponds to the electrode 32 of FIG. 1 was connected to ground. The cell 46 was provided with a side window 54 which enables visual observation of OBD. A convex lens 56 imaged the optical breakdown region through the window 54 onto a computerized video photodiode array which functions as a camera 58.

Referring to FIG. 4, the upper plot illustrates the Gaussian intensity profile of the laser beam 42, with the horizontal or z-axis being parallel to the beam propagation direction and the vertical or y-axis being perpendicular thereto. The spatial profile of the beam 42 is designated as 60, the minimum beam diameter at the focal point as 62, and the confocal parameter as 64. The interaction volume of the beam profile 60 is equal to the focal volume of the profile 60, which is equal to the product of the area of the beam at the focal point and the confocal length.

The lower plot of FIG. 4 illustrates the pulse intensity I as a function of propagation direction. A distance 68 is equal to the pulse length of the beam 42, which is also approximately equal to the coherence length thereof.

Figure 5:
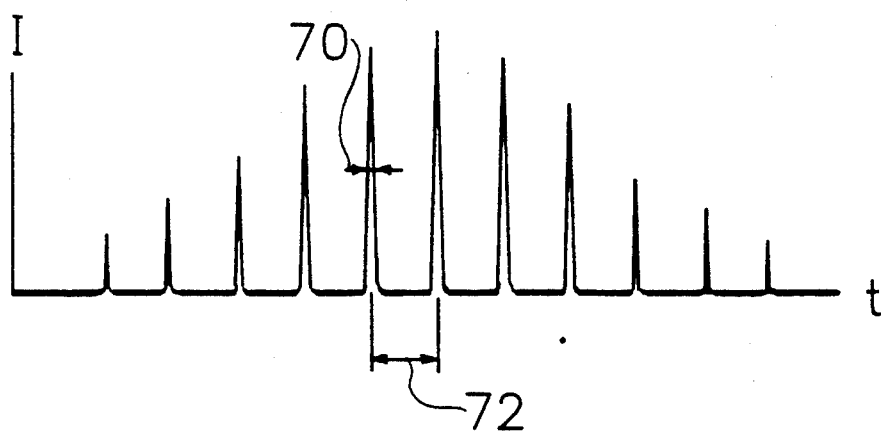
FIG. 5 is a diagram illustrating a waveform of a laser pulse train in the experimental apparatus.

FIG. 5 illustrates the temporal characteristics of a Gaussian pulse train of the laser beam 42 used in the experimental apparatus of FIG. 3. The horizontal axis t represents time whereas the vertical axis I represents intensity. The pulse train, or macro-pulse, is comprised of micro-pulses having a pulse width 70 and a pulse separation 72.

In accordance with the experiment, a Gaussian train of seven or eight pulses having a duration $T_p$ (70) of 200 ps and an inter-pulse separation 72 of 7.5 ns was focussed into the center of the cell 46 which contained $SF_6$ gas at a pressure between 155 and 316 psi. The diameter of the beam 42 entering the lens 44, which has a focal length of 12.5 cm, is approximately 4 mm. Assuming a Gaussian intensity profile, the calculated beam diameter $Z_0$ (62) is 44 micrometers. An electrical voltage or potential ranging between 9 and 28.9 kV was applied by the source 48 across the electrodes 50 and 52, which were separated by about 1 mm. The wavelength of the laser beam 42 was 1.06 micrometers. The pulse and coherence lengths designated as 68 in FIG. 4 were about 6 cm. The total energy $E_{tr}$ in the pulse train was less than about 65 mJ, and the total effective duration $t_{tr}$ of the pulse train was 45 ns.

The results of the experiments for different values of pulse energy, $SF_6$ pressure, and electrical potential are tabulated in FIG. 6. Sparks produced by optical breakdown in the cell 46 were photographed by the camera 58 through the window 54. The relative number or fractional occurrence of OBD was measured by taking 96 pictures for each experimental condition, counting how many of the pictures had OBD sparks in them, and dividing the counted number of pictures by 96. The values in the fractional occurrence of OBD rows of the table represent cases where the voltage HV was alternatingly applied and removed. It will be seen that the frequency of occurrence of OBD is greatly reduced upon application of the HV potential across the electrodes 50 and 52, and remains low after the potential is removed. This indicates that the electric field treatment cleaned up the impurities from the $SF_6$ gas, and that the impurities remained adhered to the electrodes 50 and 52 rather than being returned to the medium.

Electric field quenching of OBD in accordance with the present invention is capable of further raising the OBD threshold by removing free electrons from the focal volume of the medium at a rate which is sufficient to maintain the electron density in the medium below the critical density at which avalanche breakdown initiates. An inherent feature of the breakdown process is that free electrons created by photon absorption during one pulse contribute to an increase in the free electron density in the focal volume, thus increasing the possibility of OBD during successive pulses. The present invention suppresses this effect by increasing the potential HV to a high enough level at which free electrons generated during pulses are swept out of the focal volume during the intervals between pulses, and do not cause an increase in the free electron density in the interaction volume during subsequent pulses.

Figure 7:
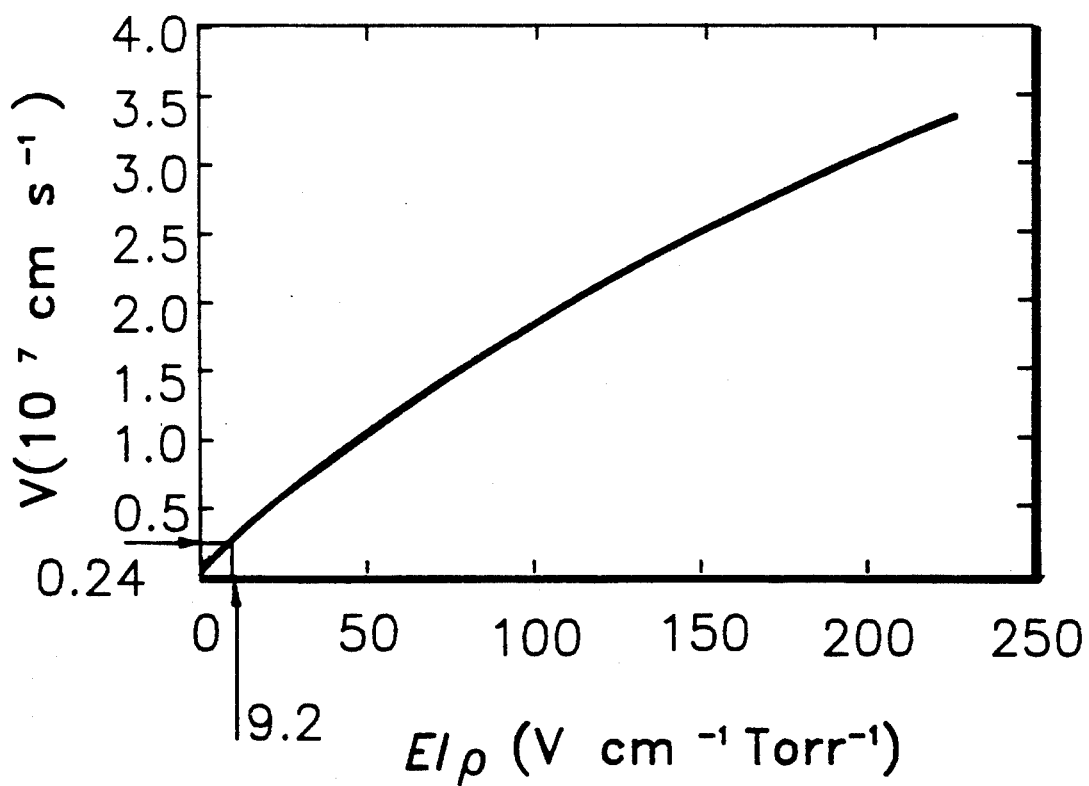
FIG. 7 is a graph illustrating the relationship between major parameters in the experimental apparatus.

FIG. 7 illustrates the electron drift velocity V in gaseous $SF_6$ as a function of the ratio of applied voltage E to gas density $\rho$, extrapolating data obtained from "Calculation of $SF_6$ transport coefficients from revised data", by J. P. Novak et al, J. Phys. D: Appl. Phys.,15 (1982), L105-110. In the absence of an applied electrical field, an electron will diffuse about 30 micrometers during an interpulse time interval of 7.5 ns. This is less than the focal diameter of the laser beam, which is approximately 44 micrometers. Thus, electrons generated by photon interaction in the medium will not diffuse out of the focal volume during the inter-pulse time interval, but will accumulate therein to cause OBD.

However, neglecting space charge effects, at a value of $E/\rho$ of 9.2 V cm$^{-1}$ Torr$^{-1}$, a free electron will drift approximately 180 micrometers during an interpulse period of 7.5 ns, and will be swept well out of the focal volume during an inter-pulse interval. This will effectively prevent accumulation of free electrons and increasing electron density, thereby increasing the OBD threshold to a very high level. The drift and diffusion lengths for several important values taken from the graph of FIG. 7 are listed in tabular form in FIG. 8.

It will be noted that the principle of operation of the embodiment of FIG. 2 is conceptually similar to that of the embodiment of FIG. 1.

While several illustrative embodiments of the invention have been shown and described, numerous variations and alternate embodiments will occur to those skilled in the art, without departing from the spirit and scope of the invention. For example, the operating parameters may be selected such that the electrical potential applied across the electrodes is sufficiently high to remove impurity ions or electrons from the interaction volume which are optically generated by the laser field. This potential may be lower than what would be required to electrically ionize the impurities. It is further within the scope of the invention to select operating parameters such that the impurity ions or free electrons are removed from the interaction volume during laser pulses, between micropulses, between successive pulse trains, or during a combination of these time intervals. It is intended, therefore, that the invention not be limited solely to the described embodiments and that the appended claims cover any and all such variations, modifications and embodiments within the scope of the present invention.

We claim:

1. A method of quenching optical breakdown, comprising the steps of:
    (a) providing a medium;
    (b) causing a laser beam to propagate through the medium; and
    (c) applying an electrical field across an optical interaction volume of the medium of sufficient magnitude to increase an optical breakdown threshold of the medium and thereby quench optical breakdown of the medium induced by interaction of the laser beam with the medium, the magnitude of said electrical potential being selected to produce an electric field voltage across said optical interaction volume that is substantially less than the medium's electrical breakdown voltage.

2. A method as in claim 1, in which step (a) comprises providing the medium in the form of a transparent, non-linear gas.

3. A method as in claim 1, in which step (a) further comprises providing a cell for enclosing the medium, step (c) further comprising providing first and second electrodes positioned to create electric field lines passing through the interaction volume of the medium and applying the electrical potential across the first and second electrodes.

4. A method as in claim 3, in which said magnitude of the electrical potential in step (c) is sufficiently high to pull optically ionized impurities from the interaction volume of the medium and move the resulting ions to at least one of the first and second electrodes.

5. A method as in claim 4, in which steps (a) and (c) respectively comprise selecting a material composition of the medium and a material composition of the first and second electrodes in such a manner that ions moved to the first and second electrodes will substantially permanently adhere thereto.

6. A method as in claim 3, in which said magnitude of the electrical potential in step (c) is sufficiently high to cause movement of free electrons out of the interaction volume of the medium.

7. A method as in claim 1, in which step (a) further comprises providing a cell for enclosing the medium, step (c) further comprising providing first and second electrodes inside the cell across the interaction volume of the medium and applying the electrical potential across the first and second electrodes.

8. A method as in claim 1, in which step (a) further comprises providing an electrically non-conductive cell for enclosing the medium, step (c) further comprises providing first and second electrodes outside the cell across the interaction volume of the medium and applying the electrical potential across the first and second electrodes.

9. A method as in claim 1, in which step (b) further comprises focussing the laser beam in the medium, the optical interaction volume being the focal volume of the laser beam.

10. A method of quenching optical breakdown, comprising the steps of:
    (a) providing a nonlinear medium and a cell for enclosing the medium;
    (b) causing a laser beam to propagate through the medium in the form of pulses;
    (c) applying an electrical potential across an optical interaction volume of the medium of sufficient magnitude to remove free electrons and quench optical breakdown of the medium induced by interaction of the laser beam with the medium by providing first and second electrodes positioned to create electric field lines passing through the interaction volume of the medium and applying the electrical potential across the first and second electrodes, said magnitude of the electrical potential being sufficiently high to cause movement of free electrons out of the interaction volume of the medium during time intervals between the pulses, but substantially less than that at which said electric fields equals the medium's threshold for electrical breakdown so that the electron density remains below a critical level at which avalanche breakdown begins to occur.

11. A method of quenching optical breakdown, comprising the steps of:
    (a) providing a non-linear medium having impurities;
    (b) causing a laser beam to propagate through the medium; and
    (c) applying an electrical potential across an optical interaction volume of the medium of sufficient magnitude to quench optical breakdown of the medium induced by interaction of the laser beam with the medium, in which said magnitude of the electrical potential is sufficiently high to cause electrical ionization of impurities in the interaction volume and movement of the resulting ions out of the interaction volume, but substantially less than that required to initiate electrical breakdown of the medium.

12. A method of quenching optical breakdown, comprising the steps of:
    (a) providing a non-linear medium having impurities;
    (b) causing a laser beam to propagate through the medium in the form of trains of pulses; and
    (c) applying an electrical potential across an optical interaction volume of the medium of sufficient magnitude to increase an optical breakdown threshold of the medium and thereby quench optical breakdown of the medium induced by interaction of the laser beam with the medium, said magnitude of the electrical potential being selected to produce an electrical field voltage across said optical interaction volume that is less than the medium's electrical breakdown voltage and being sufficiently high to cause movement of free electrons out of the optical interaction volume during time intervals between pulse trains.

13. A method of quenching optical breakdown, comprising the steps of:
(a) providing a non-linear medium having impurities;
(b) causing a laser beam to propagate through the medium in the form of pulses; and
(c) applying an electrical potential across an optical interaction volume of the medium of sufficient magnitude to increase an optical breakdown threshold of the medium and thereby quench optical breakdown of the medium induced by interaction of the laser beam with the medium, said magnitude of the electrical potential being selected to produce an electrical field voltage across said optical interaction volume that is less than the medium's electrical breakdown voltage and being sufficiently high to cause movement of free electrons out of the optical interaction volume during the pulse.

14. A method of fabricating a cell filled with a transparent, purified, non-linear medium, comprising the steps of:
(a) providing the cell filled with said medium in unpurified form, and first and second electrodes disposed inside the cell across an interaction volume of the medium;
(b) causing a laser beam to propagate through the medium; and
(c) applying an electrical potential across the interaction volume of sufficient magnitude and for a sufficient length of time to cause ionization of impurities in the medium and movement of the resulting ions to at least one of the first and second electrodes, a material composition of the medium and a material composition of the first and second electrodes being selected in such a manner that the ions will substantially permanently adhere thereto after said length of time, the magnitude of said electrical potential being selected to produce an electric field across said interaction volume that is substantially less than the medium's electrical breakdown voltage.

15. A method of quenching optical breakdown in a medium having an optical breakdown threshold and optical parameters, comprising the steps of:
(a) causing a beam to propagate through the medium, and
(b) applying an electrical potential across an optical interaction volume of said medium with a magnitude selected to increase the optical breakdown of said medium without affecting the optical parameters of said medium, and without exceeding the medium's electrical breakdown threshold.

* * * * *